United States Patent [19]

Krude

[11] 4,449,954
[45] May 22, 1984

[54] OVERLOAD CLUTCH

[75] Inventor: Werner Krude, Siegburg-Kaldauen, Fed. Rep. of Germany

[73] Assignee: Uni-Cardan Aktiengesellschaft, Siegburg, Fed. Rep. of Germany

[21] Appl. No.: 275,601

[22] Filed: Jun. 22, 1981

[30] Foreign Application Priority Data

Jun. 24, 1980 [DE] Fed. Rep. of Germany ....... 3023541

[51] Int. Cl.³ .............................................. F16D 7/06
[52] U.S. Cl. ......................................... 464/36; 464/38
[58] Field of Search ...................... 464/30, 35, 36, 37, 464/38; 192/56 R

[56] References Cited

U.S. PATENT DOCUMENTS 2,238,583  4/1941  Dodge ........................ 192/56 R X
3,727,432  4/1973  Eaves et al. ............................ 464/35

FOREIGN PATENT DOCUMENTS 2320409  11/1974  Fed. Rep. of Germany ........ 464/36
1202595  1/1960   France .
2018368  10/1979  United Kingdom ................... 464/36

Primary Examiner—Stuart S. Levy
Assistant Examiner—Daniel P. Stodola
Attorney, Agent, or Firm—Toren, McGeady and Stanger

[57] ABSTRACT

An overload clutch having a sleeve and a hub with a cage connected to the hub having apertures in which balls are received for effecting torque transmission in the clutch. A pressure ring spring-biased to engge the balls with cam elements on the sleeve operates to urge the balls towards the sleeve. The balls engage within recesses in a control ring within the sleeve and the cam elements of the sleeve extend through windows in the control ring which are circumferentially larger than the cam elements so that the control ring and the sleeve may move to a limited extent circumferentially relative to each other. The shape of the pressure ring and of the cam elements is such that as the balls go out of engagement with the recesses in the control ring, for example when overload occurs, the force exerted on the balls is decreased so that wear is reduced under overload conditions. The ability of the control ring to move circumferentially relative to the sleeve provides a virtually free-wheeling condition if the clutch overruns.

7 Claims, 7 Drawing Figures

OVERLOAD CLUTCH

The present invention relates generally to clutch mechanisms and more particularly to an overload clutch for protecting the drive lines in machinery and the like, the clutch consisting of a sleeve member and a hub member disposed within the sleeve member with a cage nonrotatably connected to one of the members and formed with apertures within which dog members are received. Cam means associated with one of the members and spring biased axially thereof are provided to engage the dog members and to urge them to engage in formations provided in a control ring associated with the other of the members for torque transmission therebetween.

One form of an overload clutch of the type to which the present invention relates is disclosed in French patent specification 1.202.595. However, an overload clutch of this type involves disadvantages in that after overload has occurred and after the spherical dog members have disengaged from the control ring, the cam means which comprise spring-loaded frustoconical pressure rings will still urge the dog members toward the control ring with undiminished force. This causes the clutch to act as a ratchet and may produce torque peaks which are twice as high as the nominal torque to be transmitted thereby causing wear, and development of heat and noise.

A further disadvantage of an overload clutch of the type mentioned above and described in the prior art involves the fact that a free-wheeling effect cannot be achieved and that it may possibly occur that even when the driven clutch part overruns the aforementioned disadvantages resulting from the ratchet effect would also occur.

Accordingly, the present invention is directed toward provision of an overload clutch which, when overload occurs, will rotate with a torque which is reduced relative to the nominal torque. Furthermore, the invention is intended to provide a clutch which will automatically shift into the free-wheeling position when the driven clutch part overruns and which will automatically switch back into the torque transmitting position when the driving clutch part moves ahead after overrun has terminated.

SUMMARY OF THE INVENTION

Briefly, the present invention may be described as an overload clutch comprising a driving member and a driven member adapted to be placed in torque transmitting relationship with each other, a cage nonrotatably connected with one of said driving member and said driven member and formed with apertures, a plurality of dog members received in said apertures, axially spring-biased means mounted on said one member engaging the dog members to urge the dog members to move at least in directions radially of the clutch, a plurality of cam elements mounted on the other of the driving and driven members adapted to engage the dog members, control ring means operatively interposed between the driving and driven members, windows formed in the control ring means having the cam elements extending therethrough, the windows being formed with a circumferential dimension greater than the circumferential dimension of the cam elements to enable the control ring means to undergo limited circumferential movement relative to said other member, and formations in the control ring means adapted to receive the dog members therein thereby to effect torque transmitting engagement of the clutch. The cam elements and the axially spring-biased means are configured to control movement of the dog members into and out of torque transmitting engagement relative to the formations in the control ring means in accordance with the relative circumferential positioning between the control ring means and said other member upon which the cam elements are mounted.

In a specific embodiment of the invention, the driven member may be a clutch sleeve within which the control ring means is arranged and the driving member may be a clutch hub having the axially spring-biased means mounted thereon. The formations in the control ring means may be formed as radial indentations or recesses and the windows in the control ring means are uniformly spaced across the circumference and will have axial centers which are unilaterally offset relative to the axial center of the recesses of the formations.

The cam elements are formed with a conical cross-section which is radially tapered inwardly of the clutch when viewed in the axial cross-section thereof and the cam elements are uniformly spaced about the circumference of the clutch. The axially spring-biased means may be formed as expanding cams having a cone angle taken in the axial plane which is designed in such a way as to increase toward the inside of the clutch.

An advantage of an overload clutch in accordance with the invention is that after overloading has occurred and after the dog members have moved out of engagement with the formations in the control ring and out of torque transmitting position, the dog members will not be urged toward the control ring by a force as great as that which is applied when they are in torque transmitting position as a result of the shape of the cam elements and the expanding cams of which the axially spring-biased means are comprised. Thus, as compared with the torque transmitting condition of the clutch, the dog elements will experience a lower force component which is radially outwardly directed during the time that the clutch is out of torque transmitting engagement. Torque peaks occurring in the overload condition will therefore be lower than during the time that nominal torque is being transmitted.

Thus, it will be seen that because of the size of the windows in the control ring through which the cam elements extend, which makes it possible for the clutch sleeve and the cam elements to move circumferentially relative to the control ring, it becomes possible for the clutch sleeve and the cam elements to move relative to the control ring in such a way that the cam elements will be circumferentially displaced from the center of the recesses or formations within which the dog members engage for torque transmission. This makes it possible for the dog members to fall radially inwardly of the clutch so that in this position the clutch can freewheel with a very low residual torque.

In a specific embodiment of the invention, the cage and the expanding cams of the axially spring-biased means may be connected with the hub member which operates as the driving member while the control ring and the cam elements may be operatively associated with the sleeve member which acts as the driven member. Of course, this arrangement may be reversed and alternatively the control ring and the cam elements may be operatively associated with the hub member while the cage and the axially spring-biased expanding cams may be connected with the sleeve member. Furthermore, it will be found that the overload clutch of the present invention is particularly suitable for smaller torque values and that, additionally, because of the greater possible outer diameter of the pressure springs, the torque range can be varied within wide limits.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
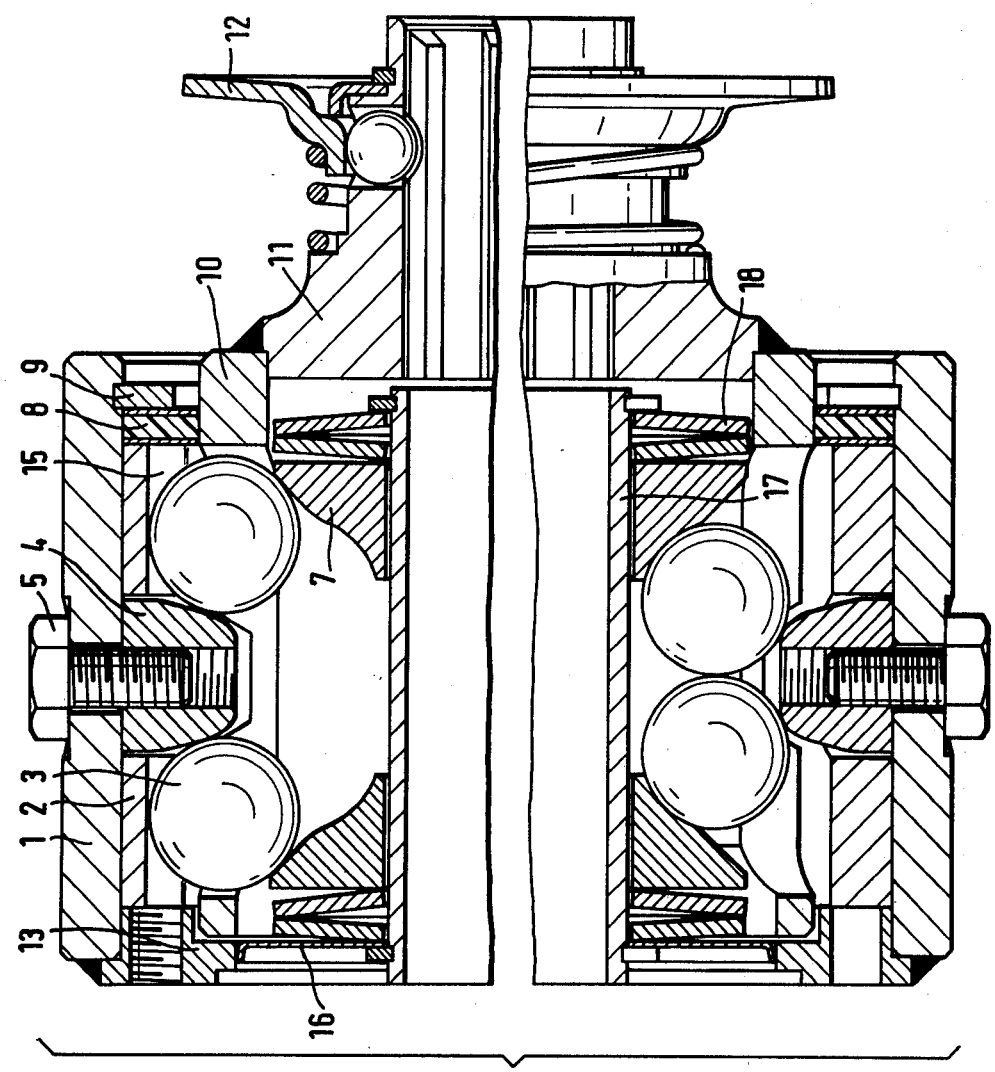
FIG. 1 is an axial sectional view taken through an overload clutch in accordance with the invention wherein the upper half illustrates the torque transmitting condition of the clutch while the lower half of FIG. 1 illustrates the free-wheeling condition.
Figure 2:
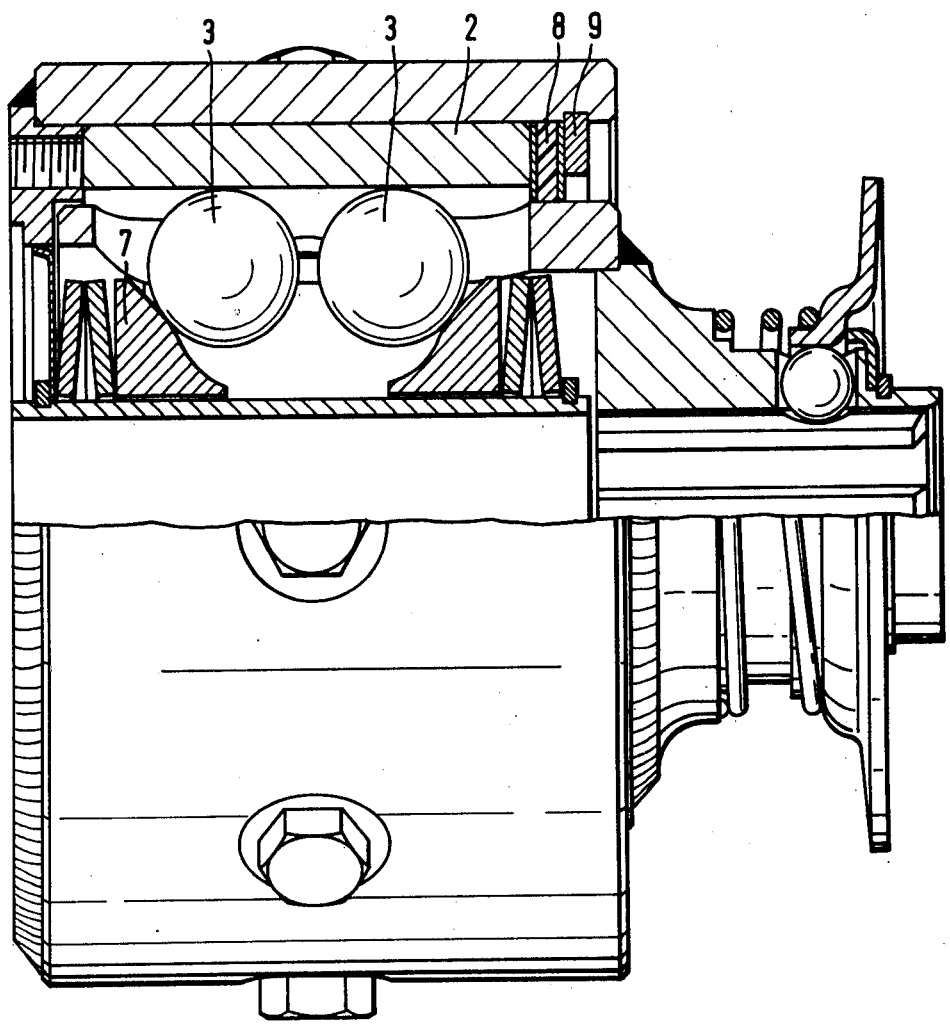
FIG. 2 is a partial axial sectional view showing in the upper half thereof the overload position of the clutch.

Referring now to the drawings wherein like parts are identified with similar reference characters throughout the various figures thereof, a clutch in accordance with the present invention is illustrated which comprises a clutch sleeve 1 having a flange 13 welded thereto which is provided with threaded apertures for attachment to a rotary drive line component. The clutch further comprises a hub 11 which is provided with a quickly detachable coupling 12 for connection to a rotatable shaft. A cage 10 is welded to the hub 11 and a supporting tube 17 is disposed inside of the cage 10. At the side of the flange 13 there is provided a lip seal 16 carried by the supporting tube 17 to close off the clutch. At its opposite end, the clutch is closed off by a seal 8 held by an abutment 9 and engaging the cage 10.

The cage 10 is provided with circumferentially spaced apertures 6 each of which receives a dog member 3 which is essentially configured in the form of a spherical ball. The dog members 3 are provided in two rows and the supporting tube 17 carries two separate expandable cams in the form of pressure rings 7 which are axially spring-biased toward each other by spring washers 18 which react against abutments adjacent the ends of the supporting tube 17.

The clutch sleeve 1 is provided with a set of circumferentially spaced cam elements 4 which are secured to the sleeve 1 by bolts 5. As viewed in section along the axis of the clutch, it will be noted that the cam elements 4 taper with a conical angle which increases toward the free, innermost ends of the cam elements thereby forming the cam elements so as to narrow radially inwardly of the clutch. Each of the cam elements 4 is adapted to engage with two of the dog members 3.

A control ring 2 is supported within the clutch sleeve 1 in a manner to be rotatable circumferentially relative thereto to a limited extent. The control ring 2 is formed with windows 14 through which the cam elements 4 extend. The circumferential dimension of the windows 14 is greater than that of the cam elements 4 and as a result the control ring 2 may undergo limited movement circumferentially of the clutch sleeve 1. The control ring 2 is also formed with recesses or formations 15 within which the dog members 3 may engage with the centers of the recesses 15 being unilaterally offset circumferentially relative to the centers of the windows 14.

Because of the action of the axially spring-biased pressure ring 7 on the balls 3, and due to the configuration of the surfaces of the pressure rings which engage the balls and the surfaces of the cam elements 4, the balls or dog members 3 are urged radially outwardly into engagement with the recesses 15 in the control ring 2. This holds the clutch sleeve 1 and the supporting tube 17 concentric relative to one another.

In the normal torque transmitting position, the dog members 3 are held in engagement with the recesses 15. The rotational position of the control ring 2 relative to the clutch sleeve 1 is such that the centers of the cam elements 4 will be in alignment with the centers of the recesses 15, i.e., in the torque transmitting condition the edges of the windows 14 facing away from the direction of rotation are supported by the cam elements 4.

If overloading occurs, the dog members 3 will roll out of the recesses 15 in the direction of rotation and the clutch will act as an overload ratchet. The entire force system consisting of the supporting tube 17, the spring washers 18 and the pressure rings 7 is capable of rotating as a complete unit so that a satisfactory rolling action of the dog members 3 will be ensured.

As a result of the shape of the cam elements 4, which taper with a narrowing configuration radially inwardly of the clutch, and also because of the shape of the axially spring-biased pressure rings 7, when the clutch is in the overload condition the dog members 3 will be urged outwardly with a decreased force component. The clutch thus rotates at a ratchet torque which is reduced as compared with the nominal torque that it will transmit in normal use and this will effect reduction in the generation of heat and noise and in reduced wear.

Figure 3:
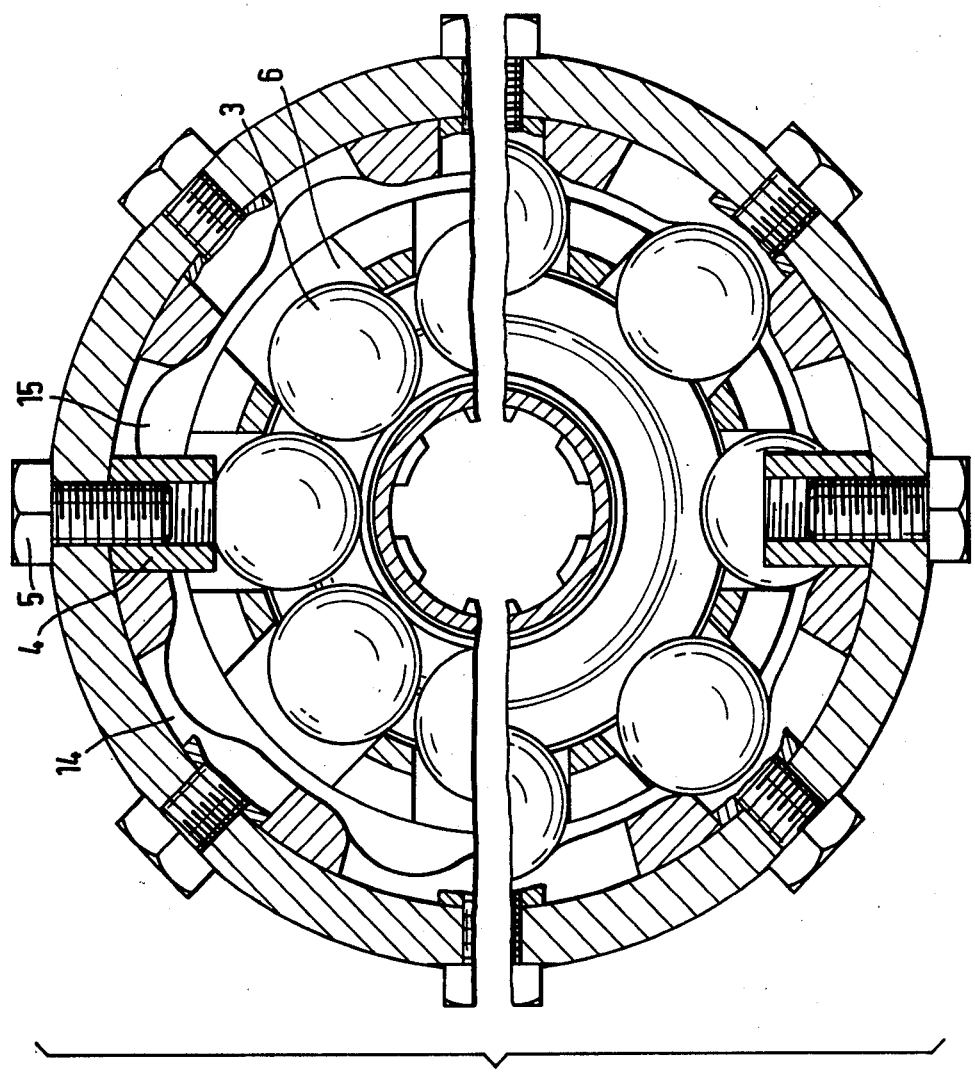
FIG. 3 is a lateral cross-sectional view taken through the clutch with the upper half of FIG. 3 depicting the free-wheeling position of the clutch while the lower half of FIG. 3 depicts the torque transmitting condition thereof.
Figure 4:
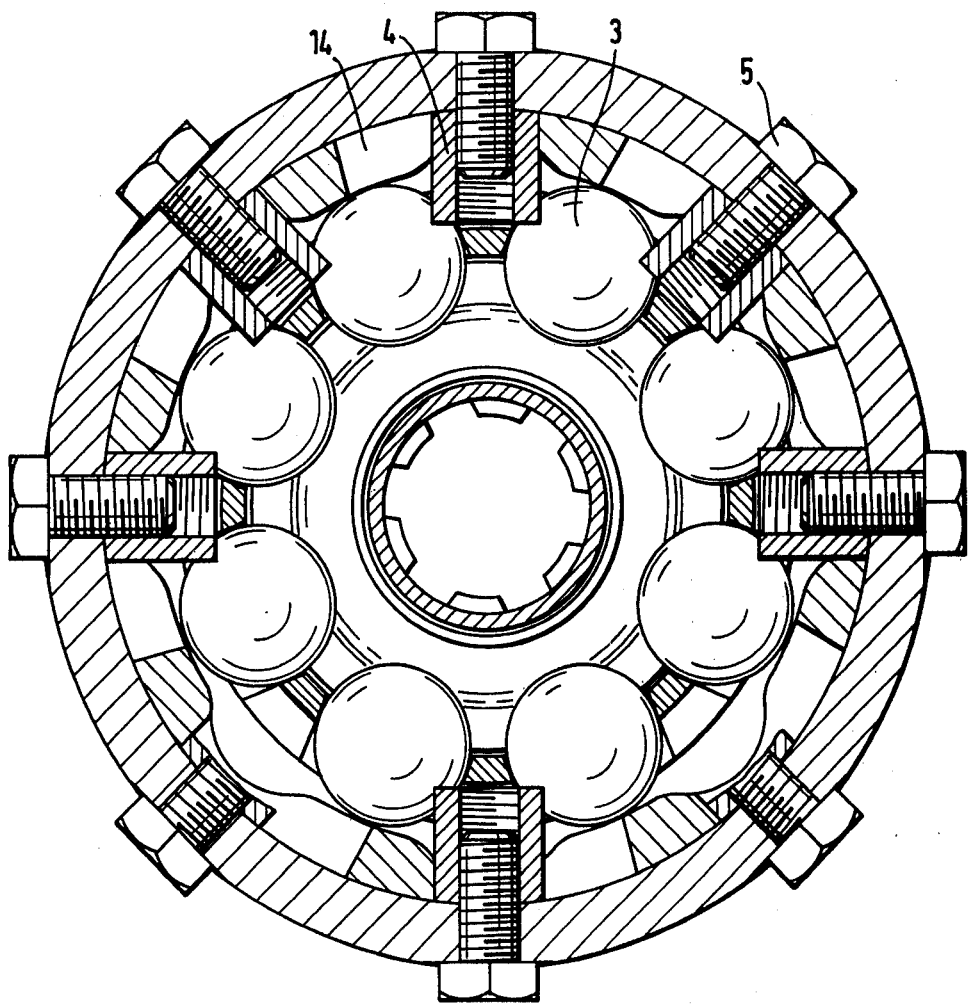
FIG. 4 is a lateral sectional view showing the clutch in the overload condition.

If the clutch hub 11 is taken as the input or driving member of the clutch and if the sleeve 1 is taken as the output or driven member of the clutch, then during overrunning of the clutch the output or sleeve 1 will overrun the input and the sleeve 1, as illustrated in the upper half of FIG. 3, will rotate in the direction of rotation of the clutch assembly relative to the control ring 2. The cam elements 4 will then no longer support the dog members 3 and the dog members 3 will escape radially inwardly. So long as the sleeve 1 continues to overrun the clutch hub 11, the clutch will transmit a torque which is near zero.

As soon as the overrunning condition ceases, the clutch sleeve 1 and the cam elements 4 will move back into their original position relative to the control ring 2 and the dog members 3 will be returned to the torque transmitting position by the force of the spring-biased pressure rings 7. This will ensure automatic changeover into the overload ratchet condition and subsequently into the torque transmitting condition.

Figure 5A:
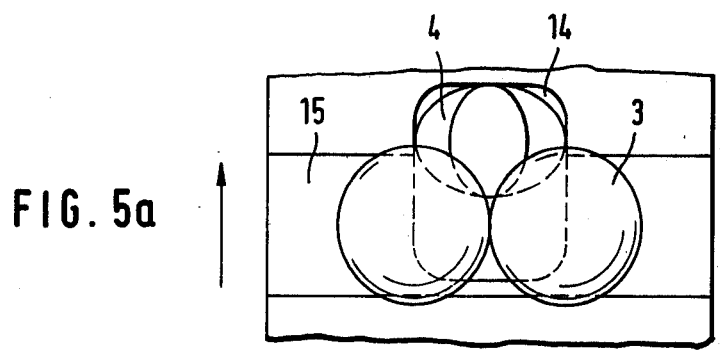
FIGS. 5a, 5b, and 5c are each schematic developed views taken from the inside of the clutch depicting individual functional components of the clutch.
Figure 5B:
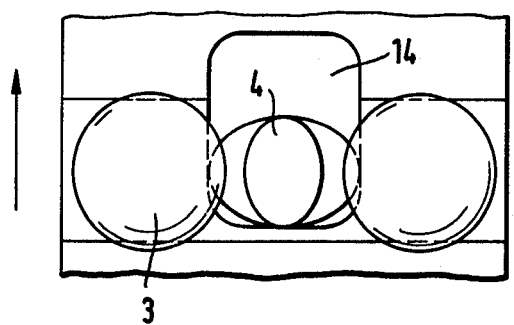
Figure 5C:
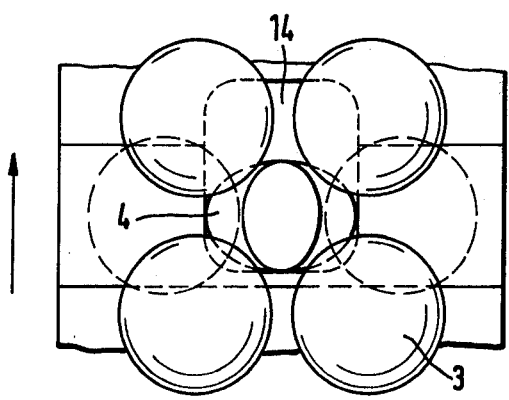

FIGS. 5a to 5c illustrate operative parts of the clutch shown in various operating conditions. These views are developed views looking from the clutch axis.

In FIG. 5a there is illustrated the free-wheeling position of the clutch, the clutch rotating in the direction indicated by the arrow. The cam elements 4 have rotated out of the torque holding position relative to the dog elements 3 and the dog elements 3 can then move radially inwardly and together. The dog elements 3 can then move underneath the cam elements 4 nearly force-free.

FIG. 5b illustrates the torque transmitting position in which the cam elements 4 are positioned between the dog elements 3 and in contact therewith. In contrast to FIGS. 5a and 5c which both illustrate conditions which only pertain momentarily, FIG. 5b shows the permanent position of the components relative to each other in the torque transmitting condition.

FIG. 5c illustrates the case of overloading as a momentary condition. The broken line indicates that the dog members 3 when passing the cam elements 4 are not fully moved into the torque transmitting position so that the full ratchet torque cannot develop.

Although in the embodiment of the clutch of the present invention described herein, the cam elements and the control ring are shown as associated with the clutch sleeve, and the cage and the pressure rings 7 are shown as associated with the clutch hub, it should be understood that the clutch could be designed alternatively with the control ring and the cam elements associated with the hub while the cage and the pressure rings are associated correspondingly with the clutch sleeve.

While a specific embodiment of the invention has been shown and described in detail to illustrate the application of the inventive principles, it will be understood that the invention may be embodied otherwise without departing from such principles.

What is claimed is:

1. An overload clutch comprising a driving member and a driven member adapted to be placed in torque transmitting relationship with each other, a cage nonrotatably connected with one of said driving member and said driven member and formed with apertures, a plurality of dog members received in said apertures, axially spring-biased cam means mounted on said one member engaging said dog members to urge said dog members to move at least in directions radially of said clutch, a plurality of cam elements mounted on the other of said driving and driven members adapted to engage said dog members, control ring means operatively interposed between said driving and driven members, windows formed in said control ring means having said cam elements extending therethrough, said windows being formed with a circumferential dimension greater than the circumferential dimension of said cam elements to enable said control ring means to undergo limited circumferential movement relative to said other member, and formations in said control ring means adapted to receive said dog members therein thereby to effect torque transmitting engagement of said clutch, said cam elements and said axially spring-biased cam means being configured to control movement of said dog members into and out of torque transmitting engagement relative to said formations in accordance with the relative circumferential positioning between said control ring means and said other member.

2. A clutch according to claim 1 wherein said cam elements are formed with an increasing conical angle toward their free ends, as viewed in section along the axis of said clutch.

3. A clutch according to claim 1 wherein said axially spring-biased cam means comprise a pressure ring of nonconstant conical angle.

4. A clutch according to claim 1 wherein there are provided two rows of said dog members and two of said cam means.

5. A clutch according to claim 1 wherein said driving member comprises a hub member and wherein said driven member comprises a sleeve member, said cage and said cam means being connected with said hub member, and said control ring means and said cam elements being associated with said sleeve member.

6. A clutch according to claim 1 wherein said dog members comprise balls.

7. A clutch according to claim 1 wherein said axially spring-biased cam means comprise a pair of cam surfaces axially juxtaposed and extending radially outwardly of said clutch with a widening configuration, wherein said cam elements comprise a tapering configuration narrowing inwardly of said clutch, wherein said dog members comprise at least a pair of spherical balls each located to engage respectively one of said cam surfaces of said axially spring-biased cam means, and wherein said cam elements when placed circumferentially between said balls operate to cause said balls to ride up said cam surfaces of said axially spring-biased cam means to move said balls radially outwardly of said clutch.

* * * * *